United States Patent [19]

Johnson et al.

[11] 4,188,781

[45] Feb. 19, 1980

[54] NON-LINEAR DUAL MODE REGULATOR CIRCUIT

[75] Inventors: Daniel Johnson, Rexford; Raymond T. Girard, Scotia, both of N.Y.

[73] Assignee: General Electric Company, Schenectady, N.Y.

[21] Appl. No.: 899,795

[22] Filed: Apr. 25, 1978

[51] Int. Cl.² .............................................. F02C 9/08
[52] U.S. Cl. ............................................. 60/39.28 R
[58] Field of Search ................................. 60/39.28 R

[56] References Cited

U.S. PATENT DOCUMENTS

| | | | |
|---|---|---|---|
| 3,151,450 | 10/1964 | Blackaby | 60/39.28 R |
| 3,520,133 | 7/1970 | Loft et al. | 60/39.28 R |
| 3,854,287 | 12/1974 | Rembold | 60/243 |
| 4,010,605 | 3/1977 | Uram | 60/39.28 R |
| 4,077,204 | 3/1978 | Itoh | 60/39.28 R |

Primary Examiner—Louis J. Casaregola
Attorney, Agent, or Firm—Jerome C. Squillaro

[57] ABSTRACT

A control circuit is described for sensing and correcting deviations in speed of a turbine-generator. The control circuit compares actual turbine speed with a speed reference signal and provides a non-linear speed control signal to the turbine. The non-linear speed control signal is characterized by a first substantially constant slope for deviations in speed below a preselected deviation and a second substantially greater slope for deviations in speed above the preselected deviation. Substantially improved power system frequency regulation is thereby maintained.

10 Claims, 4 Drawing Figures

NON-LINEAR DUAL MODE REGULATOR CIRCUIT

BACKGROUND OF THE INVENTION

The present invention relates to control systems for gas turbine-generators and more particularly to a control system for providing improved frequency regulation under varying load conditions.

One of the primary advantages of utilizing gas turbine-generators in steam turbine and gas turbine power plants is the ability of the gas turbine to rapidly respond to changes in load conditions so as to maintain power system frequency substantially constant. To effect a desired percentage of frequency regulation, for example, 4 percent, the turbine control system must vary the fuel flow to the turbine in accordance with a preselected or programmed manner as a function of changes in system frequency. Unfortunately, in certain situations involving large changes in system frequency, the preprogrammed rate of loading or unloading a gas turbine provides an undesirably long period of time before system frequency is reestablished within the desired regulation limits.

Accordingly, it is an object of the present invention to provide an improved control circuit which responds more quickly to frequency deviations above a preselected deviation.

Another object of the invention is to provide dual regulation of power system frequency depending upon the extent of deviation from the desired system frequency.

SUMMARY OF THE INVENTION

Briefly, the invention relates to a control circuit adapted to sense deviations in speed of a gas turbine-generator and provide a non-linear speed control signal to the fuel control of the turbine for quickly reestablishing a substantially constant speed of the turbine. In accordance with one embodiment of the present invention, an error signal representative of the difference between actual turbine speed and a speed reference signal is applied to a limiting amplifier which limits error signals above a preselected threshold and adds the limited signal to the error signal thereby creating a non-linear speed control signal which either increases or decreases fuel supply to the turbine whenever the deviation in turbine speed is above or below the preselected threshold.

DESCRIPTION OF THE DRAWINGS

The subject matter which is regarded as the invention is particularly pointed out and distinctly claimed in the concluding portion of this specification. The invention, however, both as to organization and a method of practice, together with further objects and advantages thereof, may be best understood by reference to the following description taken in connection with the accompanying drawings in which:

FIG. 3 is a graph illustrating a typical non-linear fuel control signal characteristic.

DESCRIPTION OF THE PREFERRED EMBODIMENT

Figure 1:
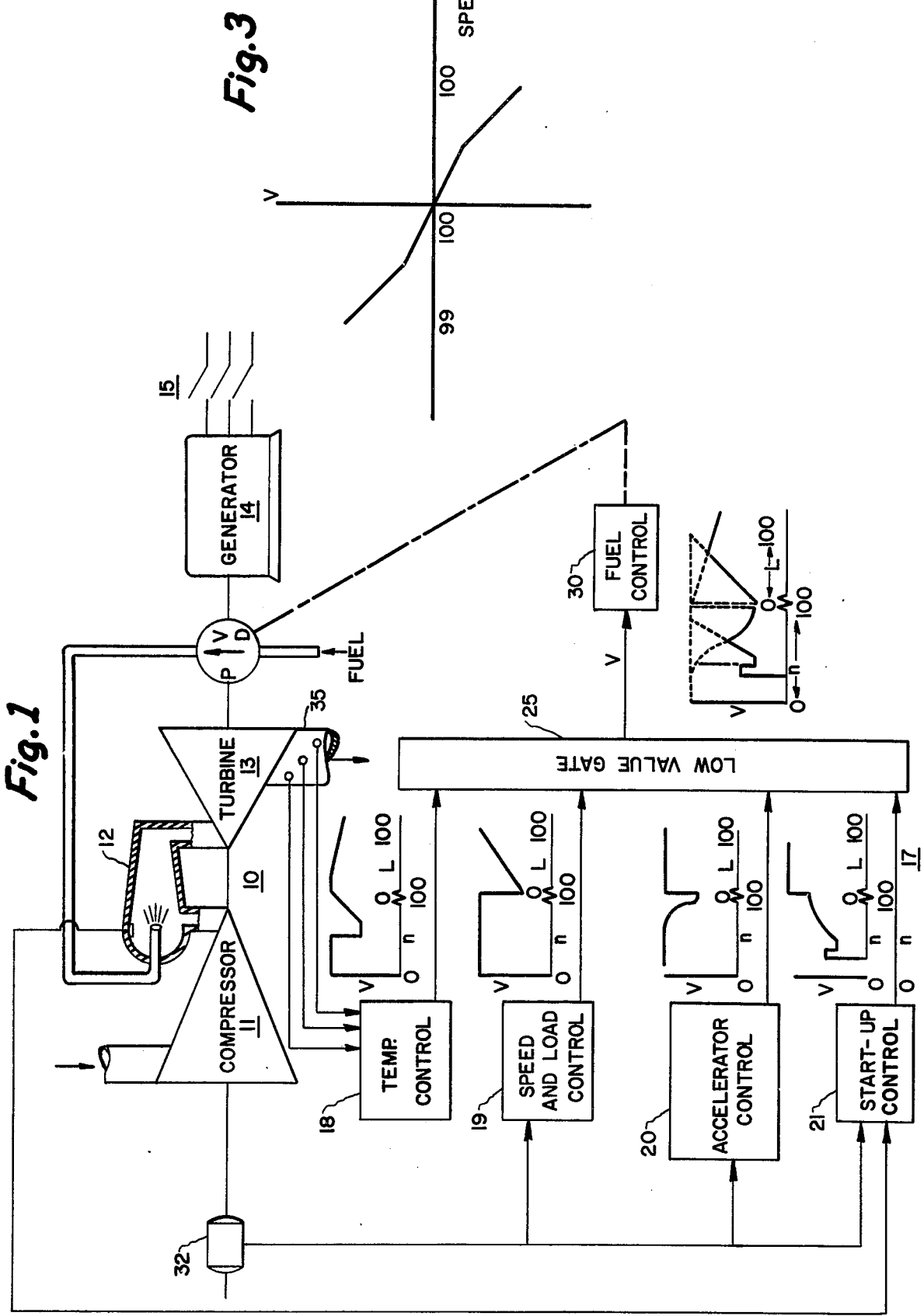
FIG. 1 is a simplified functional schematic drawing of the control system applied to a single gas turbine-generator.

FIG. 1 illustrates diagrammatically a gas turbine 10 including a compressor 11, combustion chamber 12 and turbine 13 connected to drive a generator 14. Air entering the compressor inlet supports the combustion of fuel injected into the combustion chamber 12 causing heated exhaust gases to exit through the turbine 13 thereby causing rotation of the turbine shaft and hence the generator 14. Electrical power generated by the generator 14 is coupled through circuit breakers 15 to the power distribution system.

FIG. 1 also illustrates a gas turbine control system 17 for controlling the gas turbine 10. A more complete description of the gas turbine control system 17 may be seen by reference to U.S. Pat. No. 3,520,133 issued to A. Loft and D. Johnson and incorporated herein by reference. Briefly, the control system 17 includes a plurality of closed loop controls such as a temperature control 18, a speed and load control 19 and an acceleration control 20. Also included is a startup control 21 responsive to various events normally occurring during startup such as achieving of firing speed and detection of flame in the combustion chambers. The various controllers signal the rate of fuel flow according to the parameter being constrained by each respective controller, and a low value gate 25 selects the lowest fuel flow signal and directs it to the fuel control 30. As illustrated in FIG. 1, the turbine control system includes a speed sensor 32 which senses the speed of the turbine shaft and produces an electrical signal having a magnitude directly proportional to turbine speed. The turbine speed signal is applied as an input to the speed and load control 19, the acceleration control 20 and the startup control 21, as indicated. The temperature control 18, on the other hand, is provided with inputs from the exhaust stack 35 which conducts the hot turbine exhaust gases from the turbine.

The output control signal characteristics of each of the controls 18 through 21 are diagrammatically illustrated in FIG. 1. As described above, the low value select 25 selects the lowest fuel flow signal and directs it to the fuel control 30. Since the subject matter of the present invention is directed primarily to frequency regulation by control of the turbine fuel supply, no further discussion will be provided on the manner of starting the turbine or the interrelationship between the various control loops.

Figure 2:
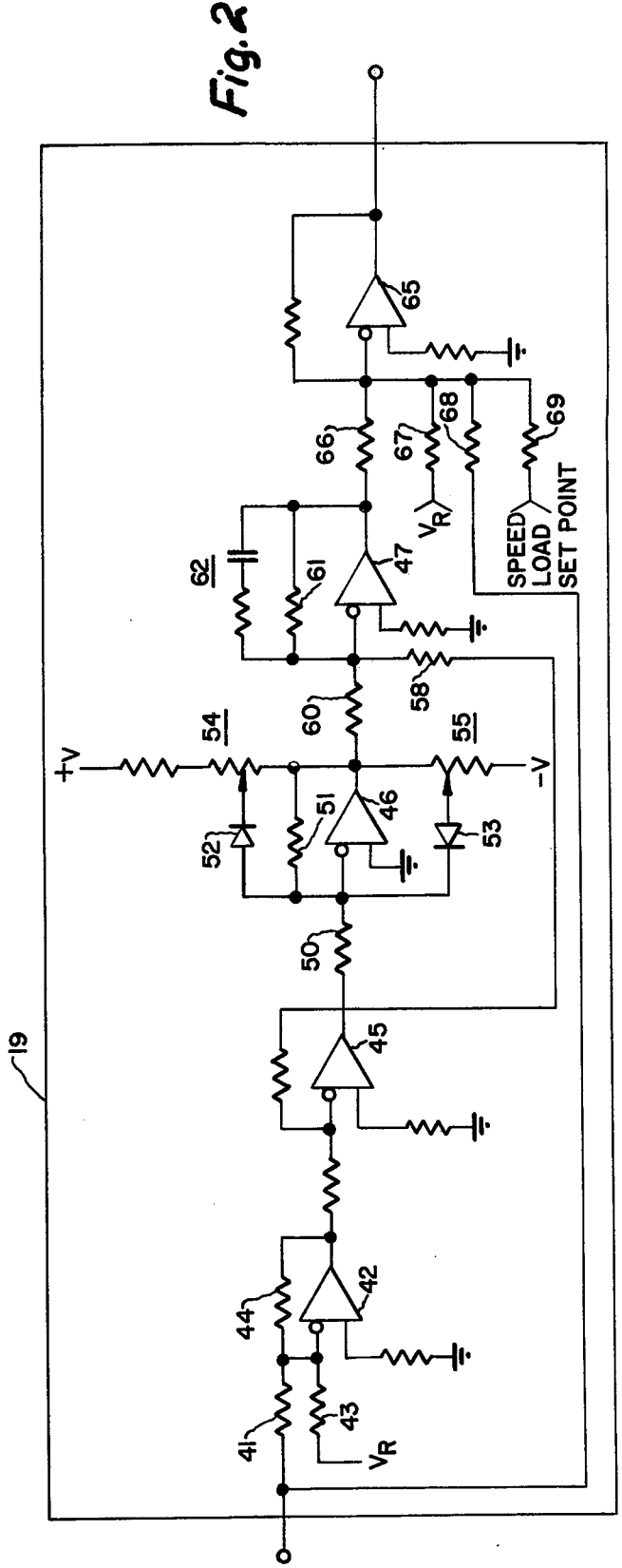
FIG. 2 is an electrical schematic diagram of the speed control portion of the control system of FIG. 1.

Referring now to FIG. 2, an embodiment of the speed and load control 19 is illustrated. The speed signal from the transducer 32 is applied to an input impedance 41 which is connected to the input of operational amplifier 42. Similarly, a voltage representative of the synchronous speed (i.e., 100% speed), as selected by an external control knob, for example, and represented by $V_R$ is applied to a second input impedance 43 which is connected to the same input of the operational amplifier 42. The forward gain of the operational amplifier 42 is adjustable and established by the ratio of the feedback impedance 44 and the input impedances 41 and 43. The operational amplifier 42 functions as a comparator and provides an output signal having a magnitude and sense proportional to the difference between the two input signals. As will become more apparent from the following detailed description, the gain of operational amplifier 42 in combination with succeeding operational amplifier 45 (which may or may not be necessary depending on the total desired gain) establishes the gain of the control system and hence sets the droop characteristic of the turbine, i.e. the tendency of the turbine speed to decrease with increase in load. By way of example the combined gains of amplifiers 42 and 45 may be set at approximately 12.

The output of operational amplifier 45 is connected via an impedance 50 to the input of an operational amplifier 46 functioning as a limiter, in a manner to be described below and via an impedance 58 to the input of a second operational amplifier 47 which performs a summing function. The operational amplifier 46 in addition to including an input impedance 50 and a feedback impedance 51, also includes a pair of diodes 52 and 53 and associated bias elements 54 and 55 respectively. The function of the diodes 52 and 53 in conjunction with the bias elements 54 and 55 is to limit the magnitude of the output voltage from the operational amplifier 46 to a level selected by the bias elements 54 and 55. For the particular application herein, the operational amplifier 46 is provided with unity gain by adjustment of impedances 50 and 51 and the output of the amplifier 46 is substantially a linear function of the input until the limiting or threshold values established by the diodes 52 and 53 and bias networks 54 and 55 are exceeded. At that point, the output of the operational amplifier 46 remains at a constant value.

As further illustrated in FIG. 2, the output of the operational amplifier 46 is connected to an input impedance 60 of the operational amplifier 47. The gain of the operational amplifier 47 is established by the ratio of a feedback impedance 61 and the input impedance 60. Included across the feedback impedance 61 is a resistor-capacitor network 62 with a time constant selected to provide the desired signal damping to ensure stable system operation.

The output of amplifier 47 is connected to the input of an amplifier 65 via an impedance 66. Also connected to the same input via impedance 67 is the synchronous speed reference signal, $V_R$ and via impedance 68, the speed signal from the transducer 32. A speed load set point signal representative of the desired speed selected is also connected to the same input via impedance 69. A more detailed description of the set point signal is found in the aforementioned U.S. Pat. No. 3,520,133.

FIG. 3 illustrates by way of example, the output voltage characteristic from the speed and load control circuit 19 as a function of variations in speed of the turbine shaft. For example, between 99.5 and 100.5 percent of rated speed, the output voltage characteristic V is exemplified by a voltage signal having a first slope. However, when the turbine shaft speed is either greater than or less than these values, the output voltage V increases at a substantially greater rate and hence has a greater slope. This non-linear voltage is applied to the fuel control 30 (as illustrated in FIG. 1) for increasing or decreasing the fuel supply in accordance with deviations from desired turbine speed. A non-linear characteristic of the type illustrated in FIG. 3 is particularly desirable in making rapid changes in turbine speed to compensate for rapid changes in generator loading and also rapid changes in turbine power output in response to system frequency changes. For example, if only minor changes in load occur, i.e. changes which produce a shaft speed change of less than the selected threshold percentage, the fuel control voltage V varies at a slower rate to compensate for this change in speed. On the other hand, if a change in speed of greater than the selected threshold percentage is detected, the rate of change of fuel control voltage V is increased substantially to more quickly correct for the substantial deviation in the turbine speed.

Figure 4:
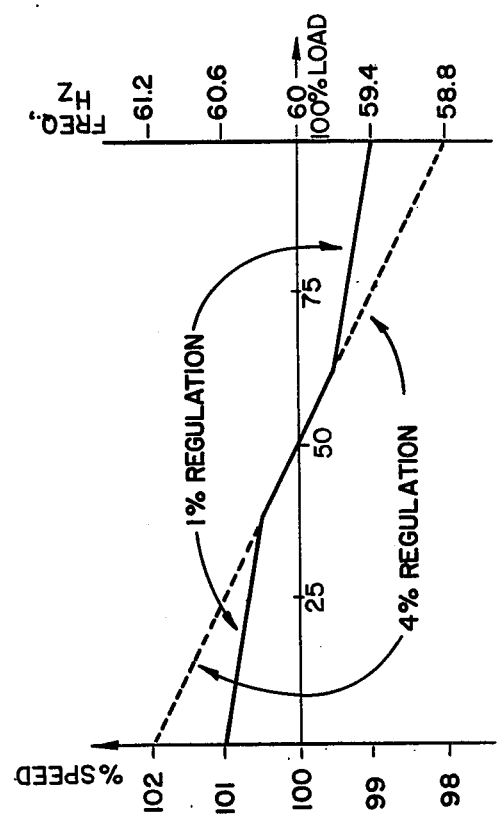
FIG. 4 is a graph illustrating system frequency variation as a function of turbine loading.

FIG. 4 illustrates the effect of the control circuit described above on frequency regulation of a typical power system. With 50 percent load on the gas turbine and 4 percent regulation or droop (without dual regulation of the instant invention), when the turbine speed varies between 98 and 102 percent of synchronous speed, correction is made in accordance with the 4 percent regulation curve. In accordance with the present invention, however, frequency deviations of less than 0.5 percent for example, are corrected in accordance with the 4 percent regulation curve whereas frequency deviations of greater than 0.5 percent are corrected in accordance with the one percent regulation curve. Accordingly, it can be readily appreciated that any substantial deviation in turbine speed is corrected more rapidly by the use of the present invention than by use of a controller having a linear characteristic, which is typical of the prior art.

Those skilled in the art can readily appreciate that the transition point or break point at which regulation switches from 4 percent to 1 percent is established by the limiting point of operational amplifier 46. Similarly, the rate or slope of the 4 percent as well as the one percent regulation curves are determined by the forward gain of the speed control circuit. Obviously, greater gain increases the slope of the control voltage V and hence effects a greater change in fuel flow to the turbine.

In summary, an improved speed and load control circuit is described which substantially improves the response of a gas turbine to changes in frequency caused by variations in load conditions.

What is claimed is:

1. In a turbine-generator control system having means to control fuel flow to the turbine in accordance with an electrical fuel command signal, a non-linear droop control circuit comprising:
   means for obtaining a difference signal proportional to the difference between a reference signal proportional to synchronous speed and a signal proportional to the actual turbine speed;
   limiter means responsive to said difference signal for providing an output signal proportional to said difference signal below a preselected threshold and a magnitude limited signal above said preselected threshold; and
   first summing amplifier means for summing said difference signal and the output signal from said limiter means;
   second summing amplifier means for summing the output of said first summing amplifier and said signal proportional to actual turbine speed for providing said command signal, said command signal enabling fuel flow at a faster rate for an output signal above said threshold than for an output signal below said threshold.

2. The non-linear droop control circuit of claim 1 wherein said command signal enables fuel flow below said threshold at a rate established by a 4 percent change in speed from no load to full load of said gas turbine-generator.

3. The non-linear droop control circuit of claim 1 wherein said command signal enables fuel flow above said threshold at a rate established by a one percent change in speed from no load to full load of said gas turbine-generator.

4. The non-linear droop control circuit of claim 1 wherein said means for obtaining a difference signal comprises an operational amplifier including inputs adapted to receive said reference signal and said turbine speed signal.

5. A control circuit adapted to sense deviations in speed of a turbine-generator and provide a non-linear fuel control signal to said turbine for regulating the speed of said turbine, said circuit comprising:
   comparator means for providing an output difference signal having a magnitude and sense proportional to the difference between a signal proportional to the speed of said turbine-generator and a reference speed;
   amplifier means responsive to said output difference signal for providing an amplifier output signal proportional to said difference signal below a preselected threshold and a magnitude limited signal above said preselected threshold; and
   means operatively summing the output difference signal, the amplifier output signal and said signal proportional to speed for providing said non-linear fuel control signal, said fuel control signal characterized by a first substantially constant slope for deviations in speed below said preselected threshold and a second substantially greater slope for deviations in speed above said preselected threshold.

6. The control circuit of claim 5 wherein said amplifier means includes means for establishing said preselected threshold.

7. The control circuit of claim 6 wherein said preselected threshold represents deviation in speed of approximately ±0.5 percent from a synchronous speed.

8. The control circuit of claim 5 wherein said means operatively summing includes:
   first summing means for summing said output difference signal and said amplifier output signal; and
   second summing means for summing the output of said first summing means and said signal proportional to speed to provide said fuel control signal.

9. The control circuit of claim 5 wherein said fuel control signal characterized by a first substantially constant slope causes said turbine to exhibit a frequency regulation of a first percent for deviations in turbine speed below said preselected threshold.

10. The control circuit of claim 9 where said fuel control signal characterized by a second substantially greater slope causes said turbine to exhibit a frequency regulation of a second percent less than said first percent.

* * * * *